United States Patent Office 3,535,316
Patented Oct. 20, 1970

3,535,316
PHENOTHIAZINES AND PROCESS
FOR THEIR PRODUCTION
Herbert Schroeter and Daniel A. Prins, Basel-Land, Switzerland, assignors to Geigy Chemical Corporation, Ardsley, N.Y., a corporation of New York
No Drawing. Continuation-in-part of application Ser. No. 516,134, Dec. 23, 1965. This application Aug. 30, 1968, Ser. No. 756,430
Claims priority, application Switzerland, Dec. 30, 1964, 16,867/64
Int. Cl. C07d 93/14
U.S. Cl. 260—243                    10 Claims

ABSTRACT OF THE DISCLOSURE

N-[(phenothiazin - 10' - yl)-alkyl]-N-alkyl hydroxylamines optionally substituted in the 2-position are psychotropic agents and are prepared by treatment of the corresponding 10-(alkylaminoalkyl) phenothiazine with acyl peroxide followed by hydrolysis. A typical embodiment is N-[3-(2'-chloro-phenothiazin-10'-yl)-propyl] - N - methyl hydroxylamine.

CROSS REFERENCE

This is a continuation-in-part of our copending application Ser. No. 516,134, filed Dec. 23, 1965, now abandoned.

DETAILED DESCRIPTION

This invention pertains to compounds of the formula:

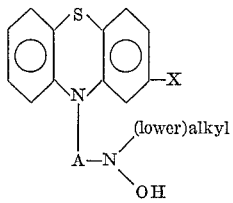

wherein

X is hydrogen, chloro, fluoro, trifluoromethyl, (lower)-alkyl or (lower)alkoxy and
A is alkylene of from 2 to 4 carbon atoms.

Also included within the scope of the present invention are the pharmaceutically acceptable non-toxic salts of the compounds of Formula I, the latter being weak bases. Such non-toxic salts can be used to advantage in place of the free hydroxy compound when they crystallize well and are not, or are only slightly hygroscopic. Examples of non-toxic acid addition salts are the salts with hydrochloric acid, hydrobromic acid, sulfuric acid, phosphoric acid, methane sulfonic ethane sulfonic acid, β-hydroxyethane sulfonic acid, camphor sulfonic acid and ethane disulfonic acid.

In Formula I depicting the compounds of the present invention, A is an alkylene chain of from 2 to 4 carbon atoms, the free valences of which are non-geminal, such as ethylene, propylene, ethylethylene, trimethylene, 1-methyltrimethylene or 2-methyltrimethylene.

By the term (lower)alkyl is intended a straight or branched hydrocarbon chain having up to 6 carbon atoms, such as methyl, ethyl, propyl, isopropyl, hexyl and the like. By (lower)alkoxy is intended a (lower)alkyl group bound through an oxygen ether linkage such as methoxy, ethoxy, propoxy and the like. Preferably (lower)alkyl and (lower)alkoxy groups have from 1 to 3 carbon atoms.

The compounds of the present invention are prepared by first treating a secondary amine of the formula:

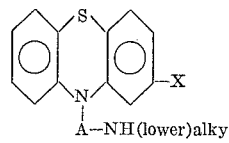

A—NH(lower)alkyl      II wherein X and A have the meanings given above, with a benzoyl or acetyl peroxide, the reaction being performed in the presence of an acid binding agent and in an inert solvent at a temperature from —60° to 20° C. to form an N-acyloxy compound of the formula:

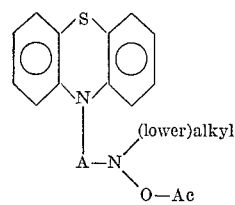

III wherein Ac is acetyl or benzoyl and X and A have the meanings given above. This N-acyloxy compound is then hydrolyzed to yield the compound of Formula I.

In the reaction o fan acyl peroxide with a compound of Formula II, the equimolar amount of a monocarboxylic acid is liberated and a corresponding amount of basic starting materials of Formula II is bound in salt form, thereby being prevented from further participation in the reaction. It is therefore advantageous to use the basic starting material as acid binding agent, i.e., to react the acyl peroxide with twice the molar amount of the secondary amine of Formula II. From the salt formed during the reaction, the amine of Formula II can be recovered in a conventional manner and then again be reacted with acyl peroxide. The carboxylic acid moiety originating from the acyl peroxide can also be bound by the addition of a separate inorganic or organic base which is stable to acyl peroxides. If desired, this can be performed in one step by adding the additional organic or inorganic base to the reaction mixture after the acid peroxide has been consumed, and then adding half of the amount of acyl peroxide originally used, this procedure being repeated until no further increase in product yield can be ascertained or until the whole amount of starting material of Formula II used has reacted. As additional base, an alkali hydroxide, such as sodium hydroxide, or an alkali metal alkanolate, such as for example methoxide or sodium ethoxide can be used.

The first step of the process involves adding a solution of benzoyl peroxide, acetyl-benzoyl peroxide or acetyl peroxide, to a solution of an amine of formula II or, vice versa preparing the solution of an acyl peroxide and adding that of an amine. It has proved necessary to maintain a reaction temperature of from about —60° to 20° C., preferably from —30° to 0° C. In order to insure optimal yields of this first step of the process according to the invention is also performed in the absence of light and in an inert gas atmosphere.

Suitable solvents for the amines and acyl peroxides are, in particular, N,N-disubstituted amides such as lower N,N-dialkyl-alkanoylamides, particularly dimethylformamide; N-alkyllactams such as N-methyl-2-pyrrolidone; di(lower)alkylsulfoxides such as dimethylsulfoxide, optionally with the addition of a lower ketone such as acetone, or of an ethereal substance such as tetrahydrofuran; chlorinated hydrocarbons such as chloroform or carbon tetrachloride; di(lower)alkyl ethers such as diethyl ether; and hydrocarbons such as toluene, or mixtures thereof. These solvents are advantageously used to maintain the solidification point of the reaction medium below the reaction temperature used.

The N-acyloxy compounds are next hydrolyzed with aqueous-alkanoic alkali metal hydroxide solution, such as potassium hydroxide in an aqueous methanol or ethanol, to form the compounds of Formula I.

The compounds of Formula I and the acid addition salts thereof have valuable pharmacological properties in that they affect the motor and autonomic functions within the central nervous system. In particular they modify the action of catecholamine, reduce spontaneous motility, have an anticataleptic action, for example, against the cataleptic effect of tetrabenazine and the like agents, and influence the body temperature. These compounds possess both tranquilizing and antidepressant properties and can be used as psychotropic agents where both tranquilization and antidepressant action is desirable. They are also useful in veterinary medicine for quieting excited animals. While the compounds of this class possess both properties, they do so in different relative degrees. These properties may be quantitatively observed by comparisons in animal models. It appears that the relative proportion of antidepressant activity to tranquilization is primarily a function of the substituent in the 2-position, as observed for example with the following three compounds of the present invention:

(I) N-[3-(phenothiazin-10′-yl)-propyl]-N-methyl hydroxylamine.

(II) N-[3-(2′-chloro-phenothiazin-10′-yl)-propyl]-N-methyl hydroxylamine.

(III) N-[3-(2′-trifluoromethyl-phenothiazin-10′-yl)-propyl]-N-methyl hydroxylamine.

Comparing these three compounds for antidepressant activity in the tetrabenazine antagonism test of Theobald et al., Arch. int. Pharmacodyn, 148, p. 560 (1948), the following $ED_{50}$ in catatonia reversal and running activity are observed:

| Compound | Catatonia reversal, mg./kg. | Running activity, mg./kg. |
| --- | --- | --- |
| I | 19 | 17 |
| II | 17 | 40 |
| III | 25 | 40 |

As can be seen all three compounds are effective in reversing cataleptic effects, the 2-unsubstituted and 2-chloro compounds appearing to be more active.

The effect of these compounds as potentiation of epinephrine and norepinephrine on cat nictating membrane according to the method of Theobald et al. ,ibid, p. 576, is shown as follows:

| Compound | Epinephrine | Norepinephrine |
| --- | --- | --- |
| I | 0.8 | 1.3 |
| II | 0.3 | 0.8 |
| III | 2.0 | 2.5 |

Again all three compounds demonstrate the antidepressant property of potentiating epinephrine and norepinephrine, the 2-unsubstituted and 2-chloro compound being more potent for this indication.

As previously indicated, these compounds also have tranquilizing properties. This can be seen in the reduction of spontaneous motility as demonstrated by the method of Theobald et al., ibid, p. 561, by which the following values for the i.p. $ED_{50}$ in mice are as follows:

Compound: $ED_{50}$ (i.p.) mg./kg.
I ------------------------------------------ 6.2
II ----------------------------------------- 4.0
III ---------------------------------------- 3.0

The adrenolytic effect of these compounds relative to phentolamine when determined via the method Theobald et al., ibid, p. 580 is as follows:

Compound: Adrenolytic potency
I ------------------------------------------ 3.6
II ----------------------------------------- 1.2
III ---------------------------------------- 1.8

As can be seen from the last two tables, the 2-chloro and 2-trifluoromethyl compounds have the greater tranquilizing activity.

The presence of these two properties within the same dose range is by no means contradictory. Thus for example, notwithstanding the excellent anticataleptic properties of compound II, it is highly effective as a neuroleptic tranquilizing agent. This can be qualitatively and quantitatively observed in the well-known Sidman Avoidance Test. In this test, tranquilization in gerbils is demonstrated by a specific inhibition of a trained avoidance behaviour. This inhibition is measured by determining the increase over a control level of the number of shocks delivered.

| Dose, mg./kg. (i.p.) | Mean shocks delivered | Mean escape latency, sec. |
| --- | --- | --- |
| Control | 10.4 | 1.6 |
| 2.5 | 12.3 | 1.4 |
| 5.0 | 12.6 | 1.6 |
| 10.0 | 33.3 | 1.2 |
| 20.0 | 90.3 | 1.6 |

| Dose, mg./kg. (p.o.) | Mean shocks delivered | Mean escape latency, sec. |
| --- | --- | --- |
| Control | 5.9 | 0.8 |
| 10 | 14.0 | 1.0 |
| 20 | 11.0 | 0.4 |
| 40 | 64.0 | 0.6 |
| 80 | 115.3 | 1.2 |
| 160 | 108.0 | 1.9 |

As can be seen, significant departures from control appear above the threshold doses of about 5 mg./kg. i.p. and 20 mg./kg. p.o. This tranquilizing action is also confirmed by the compounds' marked ability to prolong the increase in liver diphosphopyridine nucleotide following the administration of nicotinamide, a property characteristic of known tranquilizers such as chlorpromazine.

As in the case of any psychotropic agent, the actual dosage administered must be carefully titrated to the subject, his condition, age, response and mode of administration. The compounds of the present invention start to demonstrate both antidepressant and tranquilizing properties at doses from about .05 to about .10 mg./kg. of body weight.

The best mode contemplated for the use of the present invention involves the administration of the compound (or a salt thereof) orally, rectally or parenterally in a a suitable dosage unit such as dragees, tablets, capsules, powders, suppositories, solutions or suspensions.

Dosage units for oral administration will contain between 1% and 90% of a compound of Formula I or of a non-toxic salt thereof as the active ingredient. They are produced by combining the active substance with a solid, pulverulent carrier such as lactose, saccharose, sorbitol, mannitol; a starch such as potato starch, faize starch or ampylopectin; or a cellulose derivative or gelatin, optionally with the addition of a lubricant such as magnesium or calcium stearate or polyethylene glycols (Carbowaxes) of suitable molecular weights, to form tablets or dragee cores. The latter can be coated with concentrated sugar solutions also containing gum arabic, talcum and/or titanium dioxide, or with a lacquer dissolved in easily volatile organic solvents or mixtures of solvents. Dyestuffs can be added to these coatings to distinguish between varying dosages added of active substance.

Capsules are made by preparing a powder mixture and filling gelatin sheaths. Lubricants as described above may be added to the powder mixture.

Examples of dosage units for rectal administration are suppositories which consist of a combination of an active substance or a suitable salt thereof wtih a neutral fatty foundation and gelatin rectal capsules which consist of a combination of the active substance or a suitable salt thereof with polyethylene glycols of suitable molecular weight.

Ampoules for parenteral, particularly intramuscular, administration preferably contain an acid addition salt of an N-hydroxy compound of Formula I, which is dispersed or dissolved in aqueous media, in a concentration of, preferably, 0.5–5%, optionally together with suitable stabilizers, solubility promoters and buffer substances, in aqueous solution.

The two following prescriptions further illustrate the production of tablets and dragees:

(a) Two hundred and fifty grams of N-[3-(phenothiazin-10'-yl)-propyl]-N - methyl-hydroxylamine hydrogen sulfate are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed and the mixture is pressed into 10,000 tablets, each weighing 100 mg. and containing 25 mg. of active substance (hydrogen sulfate). If desired, the tablets can be grooved for better adaptation of the dosage.

(b) A granulate is prepared from 250 g. of N-[3-(2'-chlorophenothiazin-10'-yl)-propyl] - N - methyl-hydroxylamine, 175.90 g. of lactose and the alcoholic solution of 10 g. of stearic acid. After drying, the granulate is mixed with 56.60 g. of collidal silicium dioxide, 165 g. of talcum, 20 g. of potato starch and 2.50 g. of magnesium stearate and pressed into 10,000 dragee cores. These are then coated with a concentrated syrup consisting of 502.28 g. of crystallized saccharose, 200 g. of talcum, 6 g. of shellac, 10 g. of gum arabic, 0.22 g. of dyestuff and 1.5 g. of titanium dioxide and dried. The dragees obtained each weight 140 mg. and contain 25 mg. of active substance.

The following examples further illustrate the production of the new compounds of Formula I. The temperatures are given in degrees centigrade.

Example 1

135 g. of 10-(3'-methylamino-propyl)phenothiazine are dissolved in 500 ml. of dimethyl formamide and the solution is cooled in the dark under an atmosphere of nitrogen at −60°. A solution of 60 g. of benzoyl peroxide 97%) in 500 ml. of dimethyl formamide is added dropwise to this solution while stirring and within 10 minutes at −60° to −50°, the temperature is then raised to −20° and stirring is continued for 4 hours at −20°. Light is excluded until the end of this whole reaction. The temperature is then raised to 10° and 100 ml. of water are slowly added dropwise. After seeding with a little N-[3-(phenothiazin-10'-yl)-propyl] - N - methyl-O-benzoyl hydroxylamine (obtained from a sample of the reaction mixture made acid to congo paper by extracting such sample with ether, washing the ether extract with 2 N sodium carbonate solution, drying the ether extract over sodium sulfate, concentrating and crystallizing the residue from ether/pentane, a further 900 ml. of water are added dropwise and the whole is stirred for 1 hour at 10° until complete crystallization is attained. The precipitated crystals are filtered off under suction and washed first with 100 ml. of water/dimethyl formamide (1:1), and then with 100 ml. of water (the latter washing water is discarded). After drying in vacuo (water aspirator) at 50°, N-[3-(phenothiazin-10'-yl)propyl]-N-methyl-O-benzoyl hydroxylamine is obtained, M.P. 121–126°. After recrystallization from acetone/diethyl ether, the melting point is 129–131°. The combined water/dimethyl formamide filtrates are extracted with two portions of 100 ml. of ether, then made alkaline with 2 N sodium hydroxide solution and exhaustively extracted with ether or benzene. The basic starting material is removed from the combined organic phases with 2 N hydrochloric acid, the hydrochloric acid extract is made alkaline with concentrated sodium hydroxide solution and then extracted with ether. After washing the ether solution with water, drying over sodium sulfate and concentrating in vacuo, 25 g. of 10-(3'-methylamino-propyl)phenothiazine are recovered which can be used again for the above reaction.

The following compounds are obtained in an analogous way with benzoyl peroxide:

(a) From 10-(3'-methylamino-2'-methyl-propyl)phenothiazine, N-[3-(phenothiazin-10'-yl)-2-methyl-propyl]-N-methyl-O-benzoyl hydroxylamine, M.P. 167–168°, (b) From 10-(2'-methylamino-1'-methyl-ethyl)phenothiazine, N-[2-(phenothiazin-10'-yl)-1-methyl-ethyl] - N-methyl-O-benzoyl hydroxylamine, M.P. 150–152°, (c) From 10-(2'-methylamino-ethyl)phenothiazine, N-[2-(phenothiazin-10'-yl)-ethyl]-N-methyl-O - benzoyl hydroxylamine, and (d) From 10-(2-ethylamino-ethyl)phenothiazine, N-[2-(phenothiazin-10'-yl)-ethyl-O-benzoyl hydroxylamine.

Example 2

153 g. of 2-chloro-10-(3'-methylamino-propyl)phenothiazine are disolved in 500 ml. of dimethyl formamide and the solution is cooled at −60° under an atmosphere of nitrogen while excluding light. A solution of 60 g. of benzoyl peroxide in 500 ml. of dimethyl formamide is added dropwise to this solution at −60 to −50° within 10 minutes while stirring, the temperature is then raised to −20° and the whole is then stirred for 4 hours at −20°. The temperature is then raised to 10° and 100 ml. of water are slowly added dropwise. After seeding with N-[3-(2'-chlorophenothiazin-10'-yl)-propyl]-N-methyl-O - benzoyl hydroxylamine (obtained from a sample of the reaction mixture made acid to congo paper with 2 N hydrochloric acid, which sample is then extracted with ether, the ether extract is washed with 2 N sodium carbonate solution, dried over sodium sulfate, concentrated and the residue is crystallized from ether/pentane), a further 900 ml. of water are added dropwise and the whole is stirred for another hour at 10° until crystallization is complete. The precipitated crystals are filtered off under suction, washed first with 100 ml. of water/dimethyl formamide (1:1) and then with 100 ml. of water. The latter washing water is discarded. After drying at 50°/12 torr, N-[3-(2'-chlorophenothiazin-10'-yl)-propyl]-N-methyl-O-benzoyl hydroxylamine is obtained, M.P. 97–106°. Recrystallizing from ethanol raises the melting point to 109–110° and after further recrystallization from acetone/ether the substance melts at 110–111°. The water/dimethyl formamide mother liquor (2.1 litres) is washed with two portions each of 100 ml. of ether, made alkaline with 2 N sodium hydroxide solution and exhaustively extracted with benzene. The combined benzene extracts are exhaustively extracted with 2 N hydrochloric acid, the hydrochloric acid extracts are made alkaline with concentrated sodium hydroxide solution and extracted with chloroform. After washing the chloroform extracts with water, drying over sodium sulfate and concentrating in vacuo, 76 g. of 2-chloro-10-(3'-methylamino-propyl)phenothiazine are recovered which can be used again for a subsequent reaction.

The following compounds are obtained in an analogous way:

(a) From 2-trifluoromethyl-10 - (3' - methylaminopropyl)phenothiazine, the oily N-[3-(2'-trifluoromethylphenothiazin-10'-yl)-propyl]-N-methyl-O-benzoyl hydroxylamine, (b) From 2-methoxy-10-(3'-methylamino-2' - methylpropyl)-phenothiazine, N-[3-(2'-methoxy - phenothiazin-10'-yl)-2-methyl-propyl]-N-methyl-O - benzoyl hydroxylamine, M.P. 150–152°, (c) From 2-ethyl-10-(3'-methylamino - 2' - methylpropyl)-phenothiazine, N-[3-(2'-ethyl-phenothiazin - 10'-yl)-2-methyl-propyl]-N-methyl - O - benzoyl hydroxylamine, M.P. 120°, (d) From 2-chloro-10-(2'-methylamino-ethyl)phenothiazine, N-[2-(2'-chlorophenothiazin-10'-yl)-ethyl] - N-methyl-O-benzoyl hydroxylamine, M.P. 90–92°, (e) From 2-chloro-10-(2'-ethylamino - ethyl)phenothiazine, N-[2-(2'-chlorophenothiazin-10'-yl)-N-ethyl - O-benzoyl hydroxylamine, and (f) From 2-chloro-10-(3'-methylamino - 2' - methyl-propyl)-phenothiazine N-[3-(2'-chlorophenothiazin - 10'-yl)-2-methyl-propyl]-N-methyl-O-benzoyl hydroxylamine.

Example 3

39 g. of N-[3-(phenothiazin-10'-yl)-propyl]-N-methyl-O-benzoyl hydroxylamine are dissolved in 1 litre of ethanol at 70°. First 85 ml. of water and then 84 ml. of 2 N sodium hydroxide solution are added at this temperature and the whole is immediately cooled to 20°. After 15 minutes at 20°, the ethanol is removed by evaporation in vacuo (water aspirator), the residue is diluted with 100 ml. of water and then exhaustively extracted with ether. The ether extracts are washed neutral with water, dried over sodium sulfate and the solvent removed in vacuo. The oily residue crystallizes from acetone/ether, M.P. 140–143°. Pure N-[3-(phenothiazin-10'-yl)-propyl] - N-methyl-hydroxylamine is obtained after crystallizing once from the same solvents, M.P. 143–144°.

The following compounds are obtained in an analogous way:

(a) From N-[3-(phenothiazin-10'-yl)-2-methyl-propyl]-N-methyl-O-benzoyl hydroxylamine, N-[3-(phenothiazin-10'-yl)-2-methyl-propyl]-N-methyl hydroxylamine, M.P. 143–146°, (b) From N-[2-(phenothiazin-10'-yl)-1-methyl-ethyl]-N-methyl-O-benzoyl hydroxylamine, N-[2-(phenothiazin-10'-yl)-1-methyl-ethyl]-N-methyl hydroxylamine; hydrobromide, M.P. 155–157°, (c) From N-[2-(phenothiazin-10'-yl)-ethyl]-N-methyl-hydroxylamine, and (d) From N-[2-(phenothiazin-10'-yl)-ethyl]-N - ethyl-O-benzoyl-hydroxylamine, N-[2-(phenothiazin-10' - yl)-ethyl]-N-ethyl hydroxylamine.

Example 4

42.5 g. of N-[3-(2'-chloro-phenothiazin-10'-yl)-propyl]-N-methyl-O-benzoyl hydroxylamine are dissolved in 700 ml. of ethanol at about 70°, 100 ml. of water and then 100 ml. of 2 N sodium hydroxide solution are added to the solution at this temperature which is then immediately cooled to 20°. After 15 minutes at 20°, the ethanol is distilled off in vacuo, the residue is diluted with 100 ml. of water and exhaustively extracted with ether. The ether extracts are washed neutral with water, dried over sodium sulfate and evaporated to dryness in vacuo. The residue crystallizes from ether/pentane and consists of N-[3-(2'-chloro - phenothiazin-10'-yl)-propyl]-N-methyl hydroxylamine, M.P. 100–101°.

The following compounds are obtained in an analogous way:

(a) From N-[3-(2'-trifluoromethyl - phenothiazin-10'-yl)-propyl]-N-methyl-O-benzoyl hydroxylamine, N-[3-(2'-trifluoromethyl-phenothiazin - 10' - yl)-propyl]-N-methyl hydroxylamine, M.P. 108–109° (from ether/petroleum ether), (b) From N-[3-(2'-methoxy - phenothiazin-10'-yl)-2-methyl-propyl]-N-methyl-O-benzoyl hydroxylamine, N-[3 - (2' - methoxy-phenothiazin-10'-yl)-2-methyl-propyl]-N-methyl hydroxylamine, (c) From N-[3-(2'-ethyl-phenothiazin - 10' - yl)-2-methyl-propyl]-N-methyl-O-benzoyl hydroxylamine, N-[3 - (2' - ethyl-phenothiazin-10'-yl)-2-methyl-propyl]-N-methyl hydroxylamine, (d) From N - [2 - (2' - chloro-phenothiazin-10'-yl)-ethyl] - N - methyl-O-benzoyl hydroxylamine, N-[2-(2'-chloro-phenothiazin-10'-yl)-ethyl] - N - methyl hydroxylamine, M.P. 130–133°, (e) From N - [2 - (2' - chloro-phenothiazin-10'-yl)-ethyl] - N - ethyl-O-benzoyl hydroxylamine, N-[2-(2'-chloro-phenothiazin-10'-yl)-ethyl] - N - ethyl hydroxylamine, and (f) From N - [3 - (2' - chloro-phenothiazin-10'-yl)-2-methyl-propyl] - N - methyl-O-benzoyl hydroxylamine, N - [3 - (2' - chloro-phenothiazin-10'-yl)-2-methyl-propyl]-N-methyl-hydroxylamine.

What is claimed is:
1. A compound of the formula:

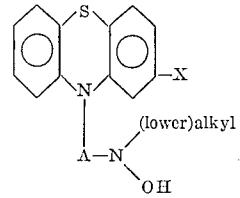

wherein

X is hydrogen, chloro, fluoro, trifluoromethyl, (lower)-alkyl or (lower)alkoxy, and A is ethylene, propylene, ethylethylene, trimethylene, 1-methyltrimethylene or 2-methyltrimethylene.

2. A pharmaceutically acceptable nontoxic acid addition salt of a compound according to claim 1.

3. A compound according to claim 1 wherein A is trimethylene.

4. A compound according to claim 1 which compound is N-[3-(phenothiazin-10'-yl)-propyl] - N - methyl hydroxylamine.

5. A compound according to claim 1 which compound is N - [3 - (2' - chloro-phenothiazin-10'-yl)-propyl]-N-methyl hydroxylamine.

6. A compound according to claim 1 which compound is N-[3-(2'-trifluoromethyl-phenothiazin-10'-yl)-propyl]-N-methyl hydroxylamine.

7. A process for the preparation of a compound according to claim 1 which comprises (a) treating a secondary amine of the formula:

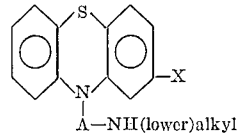

wherein A and X are as therein defined, with benzoyl peroxide or acetyl peroxide in an inert organic solvent at from about −60° to about 20° C. so as to for, respectively, the corresponding N-benzoyl or N-acetyl derivative, and (b) hydrolysing this N-benzoyl or N-acetyl derivative with an aqueous alkanolic alkali metal hydroxide.

8. The process according to claim 7 wherein the secondary amine is 10-(3-methylaminopropyl)phenothiazine, the product thereby being N-[3-(phenothiazin-10'-yl)-propyl]-N-methyl hydroxylamine.

9. The process according to claim 7 wherein the secondary amine is 3 - chloro-10-(3-methylaminopropyl) phenothiazine, the product thereby being N-[3-(2'-chloro-phenothiazin-10'-yl)-propyl]-N-methyl hydroxylamine.

10. The process according to claim 7 wherein the secondary amine is 2-trifluoromethyl-10-(3-methylaminopropyl)phenothiazine, the product thereby being N-[3-(2'-trifluoromethyl - phenothiazin-10'-yl)-propyl]-N-methyl hydroxylamine.

References Cited

FOREIGN PATENTS 1,483,748  5/1967  France.

HENRY R. JILES, Primary Examiner

H. I. MOATZ, Assistant Examiner

U.S. Cl. X.R.

424—247